US008533711B2

(12) United States Patent
Heim

(10) Patent No.: US 8,533,711 B2
(45) Date of Patent: *Sep. 10, 2013

(54) METHOD AND SYSTEM FOR ADJUSTING A SELECTION ALGORITHM FOR SELECTING A CANDIDATE HOST WITH A HIGHEST MEMORY SHARING HISTORY VALUE WITH A TARGET VIRTUAL MACHINE FROM AMONGST A SET OF HOST MACHINES THAT HAVE A STANDARD DEVIATION OF MEMORY SHARING HISTORY WITH THE VIRTUAL MACHINE BELOW A THRESHOLD AMOUNT

(75) Inventor: Itamar Heim, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 461 days.

This patent is subject to a terminal disclaimer.

(21) Appl. No.: 12/627,950

(22) Filed: Nov. 30, 2009

(65) Prior Publication Data

US 2011/0131571 A1 Jun. 2, 2011

(51) Int. Cl.
*G06F 9/455* (2006.01)
*G06F 9/46* (2006.01)

(52) U.S. Cl.
USPC .............................. 718/1; 718/102; 718/105

(58) Field of Classification Search
USPC ........................................ 718/1, 2, 105, 102
See application file for complete search history.

(56) References Cited

U.S. PATENT DOCUMENTS

| 7,203,944 B1 | 4/2007 | van Rietschote et al. |
| 7,444,459 B2 | 10/2008 | Johnson |
| 7,673,113 B2 | 3/2010 | Sugumar et al. |
| 7,716,667 B2 | 5/2010 | van Rietschote et al. |
| 7,730,486 B2 | 6/2010 | Herington |
| 8,140,812 B2 | 3/2012 | Arroyo et al. |
| 8,161,475 B2 | 4/2012 | Araujo et al. |
| 8,209,687 B2 | 6/2012 | Yuyitung et al. |
| 2005/0268298 A1 | 12/2005 | Hunt et al. |
| 2006/0069761 A1 | 3/2006 | Singh et al. |
| 2007/0130566 A1* | 6/2007 | van Rietschote et al. ......... 718/1 |
| 2007/0169121 A1* | 7/2007 | Hunt et al. ....................... 718/1 |
| 2007/0214456 A1* | 9/2007 | Casey et al. .................. 718/100 |
| 2007/0271560 A1 | 11/2007 | Wahlert et al. |
| 2008/0184229 A1* | 7/2008 | Rosu et al. ........................ 718/1 |
| 2008/0295096 A1* | 11/2008 | Beaty et al. ...................... 718/1 |

(Continued)

OTHER PUBLICATIONS

Galvin, Peter Baer, "VMware vSphere Vs. Microsoft Hyper-V: A Technical Analysis," Corporate Technologies, CTI Strategy White Paper, 2009, 32 Pages.

(Continued)

*Primary Examiner* — Thomas Lee
*Assistant Examiner* — Terrell Johnson
(74) *Attorney, Agent, or Firm* — Lowenstein Sandler LLP

(57) ABSTRACT

A mechanism for shared memory history optimization in a host selection algorithm for VM placement is disclosed. A method of embodiments of the invention includes determining candidate hosts to place a target virtual machine (VM), obtaining memory sharing history of the target VM with one or more VMs hosted by each of the candidate hosts, determining an average memory sharing history amount for each of an optimized number of the candidate hosts based on the obtained memory sharing history of the target VM with one or more VMs hosted by each of the optimized number of candidate hosts, and adjusting a score in a general selection algorithm for a candidate host with the highest average memory sharing history amount.

20 Claims, 4 Drawing Sheets

(56) References Cited

U.S. PATENT DOCUMENTS

| | | |
|---|---|---|
| 2009/0070771 A1* | 3/2009 | Yuyitung et al. ............... 718/105 |
| 2010/0005465 A1* | 1/2010 | Kawato ............................. 718/1 |
| 2010/0050180 A1 | 2/2010 | Amsterdam et al. |
| 2010/0257523 A1 | 10/2010 | Frank |
| 2010/0269109 A1 | 10/2010 | Cartales |
| 2011/0004735 A1 | 1/2011 | Arroyo et al. |
| 2011/0060832 A1 | 3/2011 | Govil et al. |
| 2011/0106949 A1 | 5/2011 | Patel et al. |
| 2011/0131568 A1 | 6/2011 | Heim |
| 2011/0225277 A1 | 9/2011 | Freimuth et al. |

OTHER PUBLICATIONS

USPTO, Office Action for U.S. Appl. No. 12/627,943 (P071) mailed Mar. 19, 2012.

USPTO, Notice of Allowance for U.S. Appl. No. 12/627,929 (P055) mailed Apr. 20, 2012.

USPTO, Corrected Notice of Allowance for U.S. Appl. No. 12/627,929 (P055) mailed Jun. 7, 2012.

USPTO, Final Office Action for U.S. Appl. No. 121627,943 (P071) mailed Oct. 15, 2012.

USPTO, Advisory Action for U.S. Appl. No. 12/627,943 (P071) mailed Jan. 3, 2013.

USPTO, Notice of Allowance for U.S. Appl. No. 12/627,929 (P055) mailed Jul. 30, 2012.

USPTO, Office Action for U.S. Appl. No. 12/627,933 (P070) mailed Jul. 3, 2012.

USPTO, Final Office Action for U.S. Appl. No. 12/627,933 (P070) mailed Nov. 20, 2012.

USPT, Office Action for U.S. Appl. No. 12/852,258 (P076) mailed Sep. 5, 2012.

* cited by examiner

METHOD AND SYSTEM FOR ADJUSTING A SELECTION ALGORITHM FOR SELECTING A CANDIDATE HOST WITH A HIGHEST MEMORY SHARING HISTORY VALUE WITH A TARGET VIRTUAL MACHINE FROM AMONGST A SET OF HOST MACHINES THAT HAVE A STANDARD DEVIATION OF MEMORY SHARING HISTORY WITH THE VIRTUAL MACHINE BELOW A THRESHOLD AMOUNT

RELATED APPLICATION

The present application is related to co-filed U.S. patent application Ser. No. 12/627,929 entitled "A Mechanism for Live Migration of Virtual Machines with Memory Optimizations", which is assigned to the assignee of the present application.

TECHNICAL FIELD

The embodiments of the invention relate generally to virtual machine (VM) systems and, more specifically, relate to a shared memory history optimization in a host selection algorithm for VM placement.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

In a virtualization systems, it is important to schedule (also referred to as selection or placement) VMs on the "best host" for the job. There are various considerations that play into a selection algorithm for selecting the "best host". The selection algorithm is relevant for both placement of the VM at launch time, and for live migration of the VM to another host. Live migration may be due to user request, or due to a trigger by a load balancing process causing the need to select a new host for the VM.

VMs may run an operating system (OS) and processes with the same portions of the memory image as other VMs. In such a case, a host process may be used to optimize memory utilization on the host, by referencing identical memory pages from multiple VMs to the same single memory page. This is known as memory sharing. Memory sharing reduces the amount of memory required in the host when running VMs with shared memory.

Thus, a virtualization system would benefit from a host selection algorithm optimized to schedule VMs with high memory sharing on the same host.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
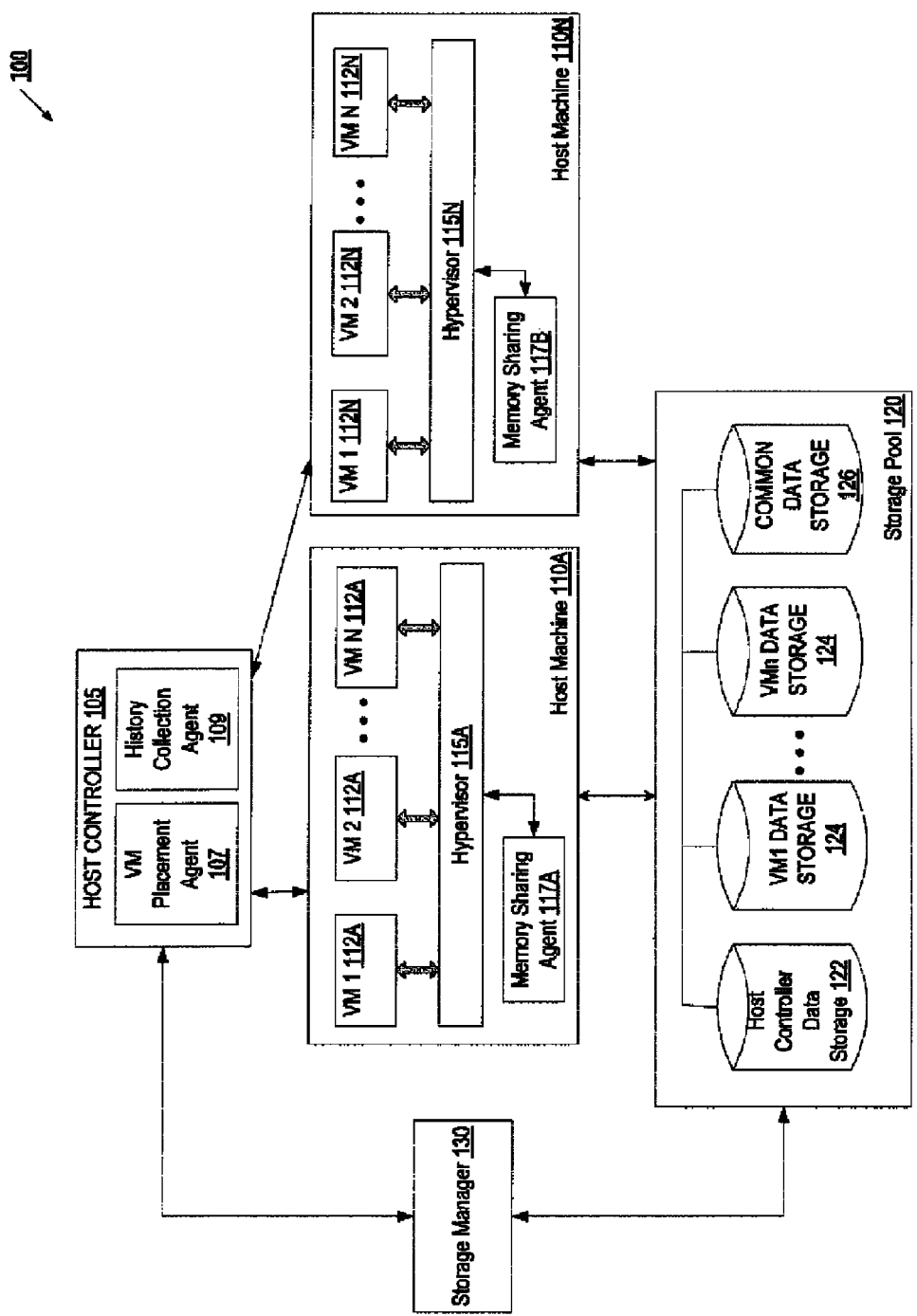
FIG. 1 is a block diagram of an exemplary virtualization architecture in which embodiments of the present invention may operate.

Embodiments of the invention provide a mechanism for shared memory history optimization in a host selection algorithm for virtual machine (VM) placement. A method of embodiments of the invention includes determining candidate hosts to place a target virtual machine (VM), obtaining memory sharing history of the target VM with one or more VMs hosted by each of the candidate hosts, determining an average memory sharing history amount for each of an optimized number of the candidate hosts based on the obtained memory sharing history of the target VM with one or more VMs hosted by each of the optimized number of candidate hosts, and adjusting a score in a general selection algorithm for a candidate host with the highest average memory sharing history amount.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for shared memory history optimization in a host selection algorithm for VM placement. Embodiments of the invention introduce the concept of shared memory optimization based on shared history as one of the factors to consider in the placement of a VM on a host. The shared memory optimization of embodiments of the invention is based on information gathered over a period of time on the amount of sharing a VM to-be-scheduled has with currently running VMs on candidate hosts. Those candidate hosts that are hosting VMs having a significant sharing history with the VM to-be-scheduled are given a higher score in the host selection algorithm for placing the VM to-be-scheduled.

FIG. 1 illustrates an exemplary virtualization architecture 100 in which embodiments of the present invention may operate. The virtualization architecture 100 may include one or more host machines 110A, 110N to run one or more virtual machines (VMs) 112A, 112N. Each VM 112A, 112N runs a guest operating system (OS) that may be different from one another. The guest OS may include Microsoft Windows, Linux, Solaris, Mac OS, etc. The host 110A, 110N may include a hypervisor 115A, 1125N that emulates the underlying hardware platform for the VMs 112A, 112N. The hypervisor 115A, 115N may also be known as a virtual machine monitor (VMM), a kernel-based hypervisor or a host operating system.

In one embodiment, each VM 112A, 112N may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110A, 110N as a local client. In one scenario, the VM 112A, 112N provides a virtual desktop for the client.

As illustrated, the host 110A, 110N may be coupled to a host controller 105 (via a network or directly). In some embodiments, the host controller 105 may reside on a designated computer system (e.g., a server computer, a desktop computer, etc.) or be part of the host machine 110A, 110N or another machine. The VMs 112A, 112N can be managed by the host controller 105, which may add a VM, delete a VM, balance the load on the server cluster, provide directory service to the VMs 131, and perform other management functions.

The host 110A, 110N may also be coupled to a data storage pool 120. Data storage pool 120 may represent multiple storage devices (e.g., disks in a disk array) or a single storage device (e.g., a hard drive of the host 110A, 110N or host controller 105). In one embodiment, the storage pool 120 includes storage areas 124 designated for individual VMs 112A, 112N. When a VM 112A, 112N is created, it is associated with its own individual data storage 124, which may be an independent storage device or a designated area of a single storage device. The host 110A, 110N may further be associated with common data storage 126 of the data storage pool 120, directly or remotely. Common data storage 126 may represent an independent storage device (e.g., a disk drive) or a remote storage device (e.g., network attached storage (NAS), etc.). Data storage pool 120 may also include areas 122 designated for use by the host controller 105, which may also be an independent storage device or a designated area of a single storage device. Although shown as a single storage pool, those skilled in the art will appreciate that data storage pool 120 may be multiple, independent storage devices in dispersed locations that are logically pooled together and managed by storage manager 130.

In one embodiment, host controller 105 may include a VM placement agent 107. VM placement agent 107 is responsible for making a determination of which host machine 110A, 110N to place a VM 112A, 112N. Placement of a VM may include placement of the VM upon its startup, as well as migration of the VM to another host. In a virtualization system it is important to schedule (also referred to as selection or placement) VMs on the "best host" for the job. There are various considerations for selecting the "best host". In one embodiment, VM placement agent 107 utilizes a general selection algorithm that considers a variety of factors for placement of a VM. Such factors may include CPU utilization, CPU speed, memory utilization, the number of virtual CPUs scheduled on the host, physical cores present on the host, and so on.

Typically, a general selection algorithm includes a process that scans for relevant hosts 110A, 110N that can launch a VM and provide all required resources for the VM, such as access to relevant storage and logical networks. The hosts 110A, 110N that satisfy these requirements are known as candidate hosts. A general selection algorithm may also include checks against exclusion criteria, which are a set of requirements that would not allow the VM to run on a certain host, thus removing that host from the list of candidate hosts for selection. Examples of exclusion criteria include: average CPU utilization over last X minutes is over Y percent; average memory utilization over last X minutes is over Y percent; and the ratio between the number of virtual CPUs scheduled on the host and physical cores is over Y percent.

A selection algorithm also includes comparison ordering to sort the remaining candidate hosts by means of a score (or any other type of transitive order) that will identify the best host. Examples of criteria in a comparison ordering algorithm to sort by include any of (or some weighted scoring of): the average host CPU utilization over the last X minutes; the average host memory utilization over the last X minutes; the ratio between the number of virtual CPUs scheduled on the host and physical cores; and the average host I/O utilization over the last X minutes.

In many cases, a VM 112A, 112N may run an OS and processes that utilize the same portions of the memory image as other VMs. In such cases, a process of the host machine 110A, 110N may be used to optimize memory utilization on the host, by referencing identical memory pages from multiple VMs to the same single memory page. This is known as memory sharing. In one embodiment, each host 110A, 110N includes a memory sharing agent 117A, 117N that operates to unify shared pages of VMs 112A, 112N running on that host 110A, 110N. In one embodiment, the memory sharing agent 117A, 117N is a Kernel SamePage Merging (KSM) feature of a Linux kernel running in host machine 110A, 110N. Instead of each VM 112A, 11N storing identical memory pages in their separate data storage 122, the memory sharing agent 117A, 117N can identify these shared pages and store one copy of these memory pages in the common data storage 124 that may be accessed by each VM 112A, 112N.

Memory sharing reduces the amount of memory required in the host when running VMs with shared memory. Thus, a virtualization system would benefit from a host selection algorithm optimized to schedule guests with high memory sharing on the same host. Embodiments of the invention utilize shared memory optimization based on shared history as one of the factors for VM placement agent 107 to consider in placement of a VM on a host 110A, 110N.

The shared memory optimization of embodiments of the invention is based on information gathered over a period of time on the amount of sharing a VM to-be-scheduled (hereinafter known as "target VM") has with currently running VMs 112A, 112N on candidate hosts 110A, 110N. The VM placement agent 107 of host controller 105 selects an optimum host 110A, 110N to place a VM by utilizing the history of memory sharing that the target VM has had with all (or some subset) of the currently running VMs 112A, 112N on all (or some subset of) candidate hosts that the VM may be placed. The rational is that even if VMs have the same OS and other characteristics, they may still be used in different ways. Embodiments of the invention provide improved sharing between VMs 112A, 112N on a host 110A, 110N by using the actual sharing levels over time of the target VM with other VMs 112A, 112N in the system.

In one embodiment, the host controller 105 includes a history collection agent 109 that collects memory sharing data from all VMs 112A, 112N that are managed by the host controller 105. In some embodiments, the memory sharing data is continually collected during VM run time, while in other embodiments the data may be collected on a periodic basis. The collected memory sharing data may be stored in the host controller's database 122 for later use by the VM placement agent 107 in a general selection algorithm.

Embodiments of the invention utilize the shared memory history of a target VM if that target VM has, in fact, previously run in the virtualization system 100. In the case of placement of VM upon its start-up, this VM should have previously run in the system in order for the shared memory consideration to be relevant. Otherwise, the VM will not have a shared history with any currently-running VMs, and this consideration will be moot. In such a case, the criteria of shared memory history in the general selection algorithm are given a low weight so as not to have an impact on the placement algorithm.

The history of shared memory can be collected in several ways, depending on the information available to the history collection agent 109. The information may include, but is not limited to, any of the following: a list of hash values of memory pages of the VM in each sampling, a list of hash values of memory pages shared by the VM in each sampling, the percentage of shared memory the VM had with all other processes on the host, and the percentage of shared memory the VM had with each other VMs on the host.

In some embodiments, the history collection agent 109 aggregates the collected results to reduce the amount of data collected. The history collection agent 109 may run an aggregation process to maintain averages of the memory sharing history information. The aggregation process combines the results of multiple samples and keeps an average score of those samples. In some cases, any of the following, individually or in combination, may be used by the aggregation process to determine the number of samples to keep: a metric, a subset of the samples (e.g., hashes), or a percentage of the samples.

Embodiments of the invention use the collected data of shared memory history for the target VM as an additional consideration in the general host selection algorithm. The collected shared memory history data may be utilized in one or more of following ways: use the optimization on all candidate hosts, use the optimization on only the top X hosts as defined by the comparison ordering algorithm, use the optimization on only candidate hosts that have a scoring difference of no more than X (absolute) or Y percent from the best host, and raise the weight of shared memory optimizations in the host selection algorithm if the system is overall constrained by memory usage (e.g., average memory on all hosts, or X percent of hosts, is higher than Y percent memory utilization).

In addition, the scoring comparison of shared memory history may be based on a variety of comparison techniques. In one embodiment, the scoring comparison algorithm may check the average sharing (by percent or by matching hashes of pages) between the target VM with all VMs currently running on each candidate hosts. A higher score is given to hosts with which the target VM had a higher sharing when running on the same host as with those VMs (not necessarily the candidate host). This higher score results in those candidate hosts having VMs with a significant sharing history with the target VM receiving more consideration in the general selection algorithm.

In some embodiments, instead of comparing the target VM to all VMs running on all candidate hosts, the scoring comparison method may compare the target VM only to VMs that have a lower standard deviation (or another method to detect anomalies) of memory sharing statistics over time. This allows for the accurate historical trends of memory sharing to be considered, while dropping any memory sharing anomalies from consideration. In some embodiments, the scoring comparison may use only the average memory sharing history with the top X (absolute number) or Y percent of VMs on a candidate host (in terms of memory sharing). In yet another embodiment, the scoring comparison may use only the memory sharing history from the last X days (instead of using all collected and aggregated history). This reduces the frequency of co-locating VMs as their usage patterns change.

Figure 2:
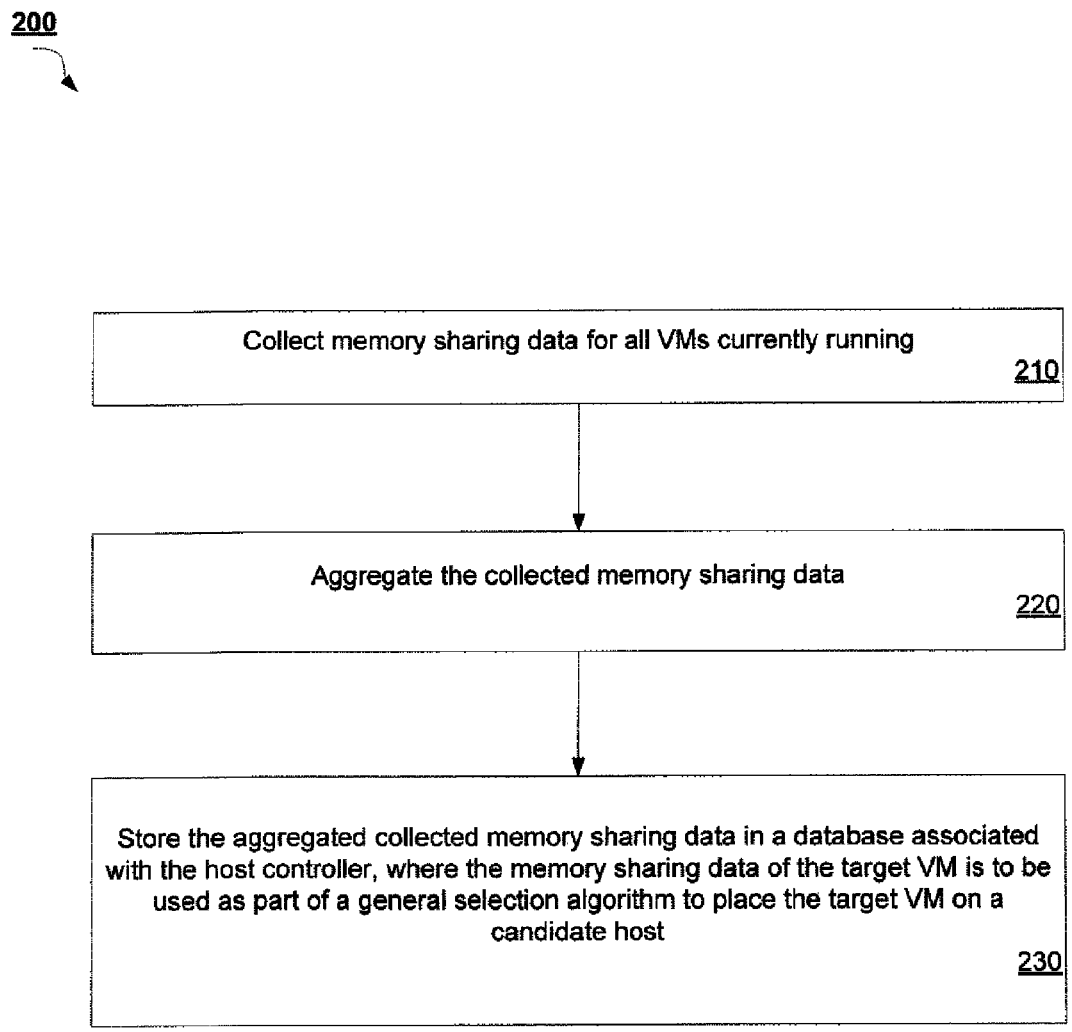
FIG. 2 is a flow diagram illustrating a method for collecting shared memory history for optimization of a host selection algorithm for VM placement according to an embodiment of the invention.

FIG. 2 is a flow diagram illustrating a method 200 for collecting shared memory history for use in a memory sharing optimization of a host selection algorithm for VM placement according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by host controller 105 described with respect to FIG. 1.

Method 200 begins at block 210 where memory sharing data for all currently-running VMs managed by a host controller is collected. In one embodiment, this may be performed by history collection agent 109 of host controller 105 described with respect to FIG. 1. In some embodiments, the sharing history may include, but is not limited to, any of the following: a list of hash values of memory pages of the VM in each sampling, a list of hash values of memory pages shared by the VM in each sampling, the percentage of shared memory the VM had with all other processes on the host, and the percentage of shared memory the VM had with each other VMs on the host.

At block 220, the collected sharing data is aggregated. The aggregation helps reduce the amount of memory sharing data collected on an on-going basis. In one embodiment, the aggregation process may maintain averages of the sharing history information. In another embodiment, the aggregation process combines the results of multiple samples and keeps an average score of only those samples. Subsequently, at block 230, the aggregated collected memory sharing data is stored in a database associated with the host controller. Subsequently, the host controller uses the sharing data of a target VM with other VMs as a consideration in a host selection algorithm to determine where to place the target VM.

Figure 3:
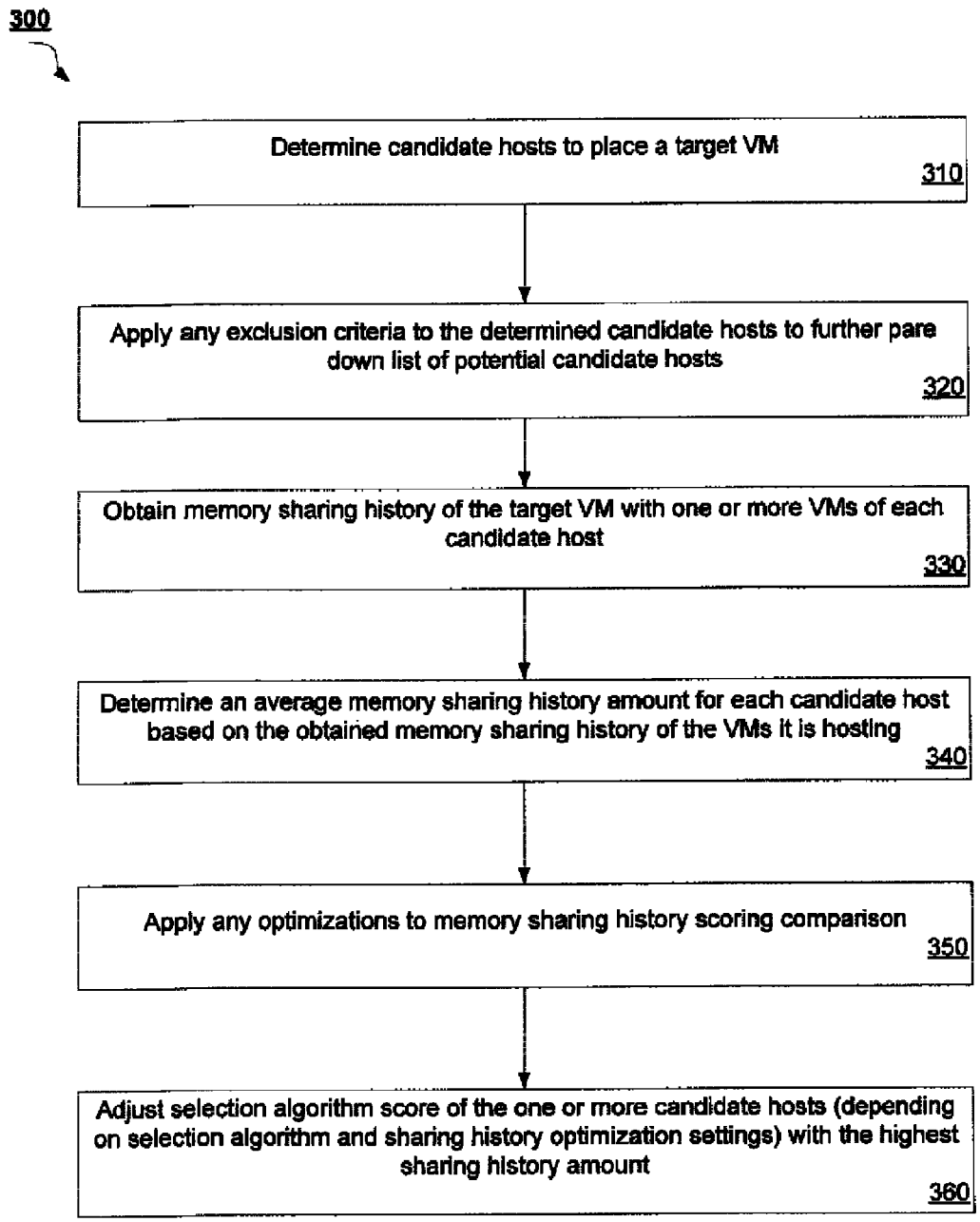
FIG. 3 is a flow diagram illustrating a method for shared memory history optimization in a host selection algorithm for VM placement.

FIG. 3 is a flow diagram illustrating a method 300 for shared memory history optimization in a host selection algorithm for VM placement according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by VM placement agent 107 described with respect to FIG. 1.

Method 300 begins at block 310 where one or more candidate hosts to potentially place a target VM are determined. The candidate hosts are determined by scanning all available hosts that can launch a VM and provide all required resources for the VM, such as access to relevant storage and logical networks. Then, at block 320, any exclusion criteria are applied to the determined candidate hosts to further pare down the list of potential candidate hosts. In some embodiments, the exclusion criteria may include, but are not limited to, the following: average CPU utilization over last X minutes is over Y percent; average memory utilization over last X minutes is over Y percent; and the ratio between the number of virtual CPUs scheduled on the host and physical cores is over Y percent.

At block 330, memory sharing history of the target VM with one or more VMs of each candidate host is obtained. In one embodiment, the memory sharing history is obtained according to method 200 described with respect to FIG. 2. At block 340, an average memory sharing history amount is determined for each candidate host based on the obtained memory sharing history of its hosted VMs with the target VM. In one embodiment, the average memory sharing history amount is determined based on the average memory sharing (by percent, or by matching hashes of pages) between the target VM and all VMs currently running on the candidate hosts. In some embodiments, an average memory sharing history amount is determined from only those VMs in a candidate host that has a low standard deviation of sharing statistics over time. In other embodiments, an average memory sharing history amount is determined using only the top X (absolute number) or Y percent of VMs (in terms of memory sharing statistics) in a candidate host. In yet another embodiment, an average memory sharing history amount is determined using only the sharing memory history for all (or some subset of) VMs in a candidate host from the last X days.

Subsequently, at block 350, optimizations are applied to a scoring comparison that utilizes the average memory sharing history amounts determined for each candidate host. For example, the optimizations may include any (or some combination of) the following: comparing average memory sharing history amounts for all candidate hosts, comparing average memory sharing history amounts for only the top X hosts in terms of current selection algorithm score, comparing average memory sharing history amounts on only candidate hosts that have a scoring difference of no more than X (absolute) or Y percent from the best host in terms of current selection algorithm score. Yet another optimization of the scoring comparison may include raising the weight applied to the memory sharing history metric in the host selection algorithm if the virtualization system is overall constrained by memory usage (e.g., average memory on all hosts, or X percent of hosts, is higher than Y percent memory utilization), and vice versa.

Lastly, at block 360, an overall selection algorithm score is adjusted for one or more candidate hosts that have the highest average memory sharing history amount, as determined at blocks 350 and 360. This higher score means that a candidate host that hosts VMs having significant memory sharing history with the target VM will receive more consideration in the general selection algorithm.

Figure 4:
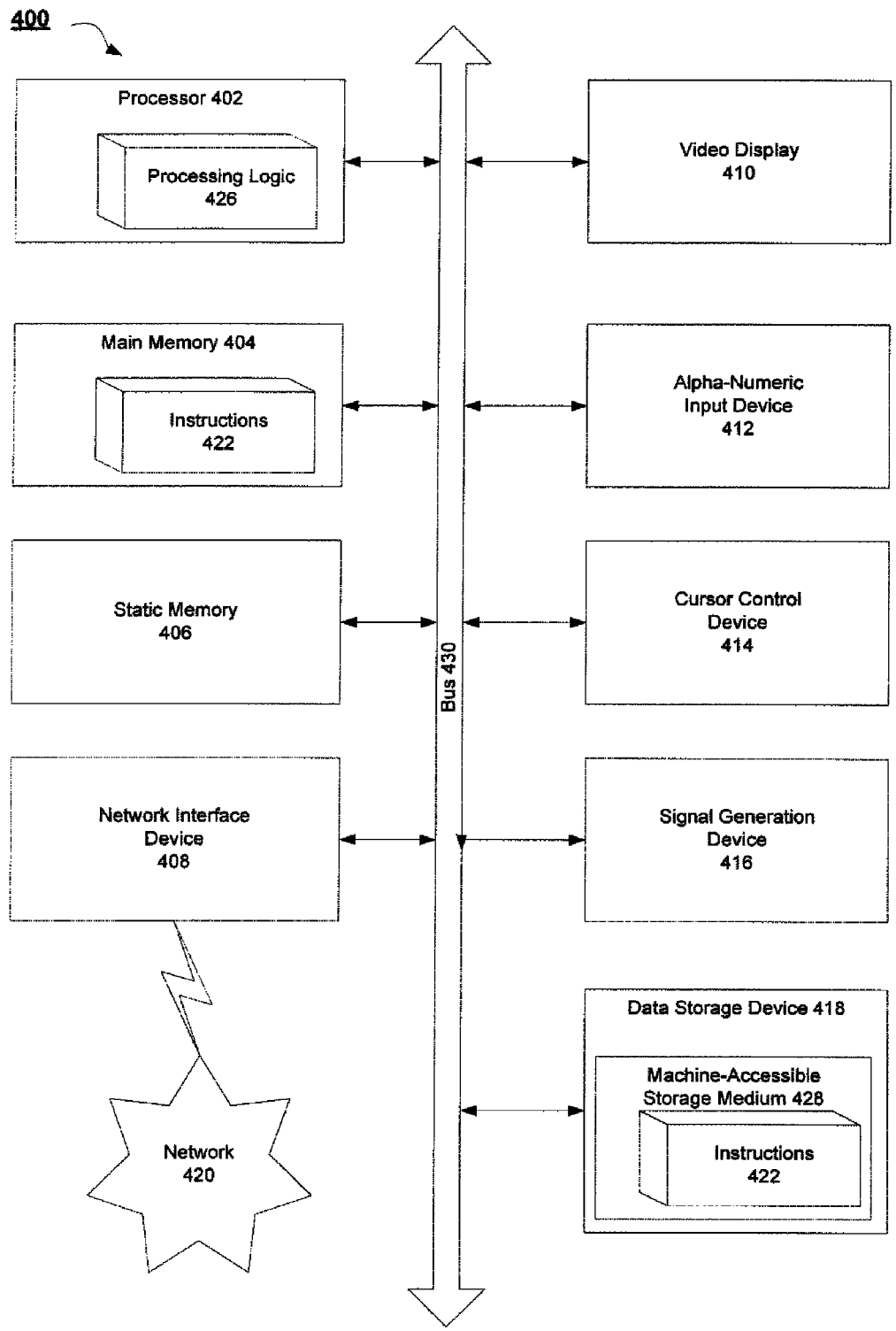
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform a shared memory history optimization in a host selection algorithm by a VM placement agent as described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform shared memory history optimization in a host selection algorithm for VM placement of methods 200 and 300 described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
   determining, by a host controller machine, candidate hosts to place a target virtual machine (VM);
   obtaining, by the host controller machine, a memory sharing history of the target VM with VMs hosted by each of the candidate hosts;
   for each candidate host in a set of the candidate hosts, determining, by the host controller machine, an average memory sharing history amount based on the memory sharing history of the target VM with the VMs hosted by the candidate host, wherein the average memory sharing history amount for a candidate host is determined only for the VMs hosted by the candidate hosts that have a standard deviation of memory sharing history below a threshold amount of memory sharing history with the target VM over a predetermined time interval; and
   adjusting, by the host controller machine, a general selection algorithm for the candidate host of the set of candidate hosts having a highest value of the average memory sharing history amount with the target VM.

2. The method of claim 1, wherein the set of candidate hosts comprises all of the determined candidate hosts.

3. The method of claim 1, wherein the set of candidate hosts comprises at least one of a predetermined number of the candidate hosts or a predetermined percentage of the candidate hosts, in terms of a current score in the general selection algorithm.

4. The method of claim 1, wherein the set of candidate hosts comprises those candidate hosts that have at most a predetermined scoring difference from a current top scoring candidate host in the general selection algorithm.

5. The method of claim 1, wherein obtaining the memory sharing history further comprises accessing previously-collected memory sharing data obtained for all VMs managed by the host controller machine.

6. The method of claim 1, further comprising applying exclusion criteria to the determined candidate hosts in order to remove one or more of the candidate hosts from consideration in the general selection algorithm, the exclusion criteria comprising at least one of average CPU utilization over a predetermined time interval, average memory utilization over a predetermine time interval, or a ratio of virtual CPUs to physical cores.

7. The method of claim 1, wherein adjusting the general selection algorithm further comprises taking into consideration whether a system of the candidate hosts is overall memory constrained.

8. A system, comprising:
   a memory;
   a processing device communicably coupled to the memory; and
   a virtual machine (VM) placement agent executed from the memory and the processing device, the VM placement agent to:
   determine candidate hosts to place a target VM;
   obtain a memory sharing history of the target VM with VMs hosted by each of the candidate hosts;
   for each candidate host in a set of the candidate hosts, determine an average memory sharing history amount based on the memory sharing history of the target VM with the VMs hosted by the candidate host, wherein the average memory sharing history amount for a candidate host is determined only for the VMs hosted by the candidate hosts that have a standard deviation of memory sharing history below a threshold amount of memory sharing history with the target VM over a predetermined time interval; and adjust a general selection algorithm for the candidate host of the set of candidate hosts of having a highest value of the average memory sharing history amount with the target VM.

9. The system of claim 8, wherein the set of candidate hosts comprises at least one of a predetermined number of the candidate hosts or a predetermined percentage of the candidate hosts, in terms of a current score in the general selection algorithm.

10. The system of claim 8, wherein the set of candidate hosts comprises those candidate hosts that have at most a predetermined scoring difference from a current top scoring candidate host in the general selection algorithm.

11. The system of claim 8, wherein the VM placement agent to obtain the memory sharing history further comprises the VM placement agent to access previously-collected memory sharing data obtained for all VMs managed by the host controller machine.

12. The system of claim 8, further comprising the VM placement agent to apply exclusion criteria to the determined candidate hosts in order to remove one or more of the candidate hosts from consideration in the general selection algorithm, the exclusion criteria comprising at least one of average CPU utilization over a predetermined time interval, average memory utilization over a predetermine time interval, or a ratio of virtual CPUs to physical cores.

13. The system of claim 8, wherein the VM placement agent takes into consideration whether a system of the candidate hosts is overall memory constrained when adjusting the general selection algorithm.

14. A non-transitory machine-readable storage medium including data that, when accessed by a machine, cause the machine to perform operations comprising:
   determining, by a host controller machine, candidate hosts to place a target virtual machine (VM);
   obtaining, by the host controller machine, a memory sharing history of the target VM with VMs hosted by each of the candidate hosts;
   for each candidate host in a set of the candidate hosts, determining, by the host controller machine, an average memory sharing history amount based on the memory sharing history of the target VM with the VMs hosted by the candidate host, wherein the average memory sharing history amount for a candidate host is determined only for the VMs hosted by the candidate hosts that have a standard deviation of memory sharing history below a threshold amount of memory sharing history with the target VM over a predetermined time interval; and
   adjusting, by the host controller machine, a general selection algorithm for the candidate host of the set of candidate hosts having a highest value of the average memory sharing history amount with the target VM.

15. The non-transitory machine-readable storage medium of claim 14, wherein the set of candidate hosts comprises at least one of a predetermined number of the candidate hosts or a predetermined percentage of the candidate hosts, in terms of a current score in the general selection algorithm.

16. The non-transitory machine-readable storage medium of claim 14, wherein obtaining the memory sharing history further comprises accessing previously-collected memory sharing data obtained for all VMs managed by the host controller machine.

17. The non-transitory machine-readable storage medium of claim 14, wherein the machine-readable storage medium includes data that, when accessed by the machine, causes the machine to perform further operations comprising applying exclusion criteria to the determined candidate hosts in order to remove one or more of the candidate hosts from consideration in the general selection algorithm, the exclusion criteria comprising at least one of average CPU utilization over a predetermined time interval, average memory utilization over a predetermine time interval, or a ratio of virtual CPUs to physical cores.

18. The system of claim 8, wherein the set of candidate hosts comprises all of the determined candidate hosts.

19. The non-transitory machine-readable storage medium of claim 14, wherein the set of candidate hosts comprises those candidate hosts that have at most a predetermined scoring difference from a current top scoring candidate host in the general selection algorithm.

20. The non-transitory machine-readable storage medium of claim 14, wherein adjusting the general selection algorithm further comprises taking into consideration whether a system of the candidate hosts is overall memory constrained.

* * * * *

UNITED STATES PATENT AND TRADEMARK OFFICE
CERTIFICATE OF CORRECTION

PATENT NO. : 8,533,711 B2  
APPLICATION NO. : 12/627950  
DATED : September 10, 2013  
INVENTOR(S) : Itamar Heim Page 1 of 1

It is certified that error appears in the above-identified patent and that said Letters Patent is hereby corrected as shown below:

In the Claims

Claim 8, Col. 11, Line 5, "candidate hosts of having" should be "candidate hosts having"

Signed and Sealed this
Eleventh Day of February, 2014

Michelle K. Lee
*Deputy Director of the United States Patent and Trademark Office*